Patented Jan. 21, 1930

1,744,602

UNITED STATES PATENT OFFICE

EIZO YOSHIOKA, OF OCHIAI-MACHI, TOYOTAMA-GORI, TOKYO-FU, JAPAN

BUOYANT AND OIL-PROOF INDIA-RUBBER

No Drawing. Application filed May 9, 1927. Serial No. 190,143.

This invention relates to an improvement in india-rubber and has for its object to produce a buoyant and oil-proof india-rubber composition adapted for the use in manufacturing articles adapted to float in water and proof against deterioration by mineral oil.

India-rubber as hitherto known of which various articles are manufactured is composed of raw rubber and such inorganic solid substance as zinc white, carbonate of lime and sulphate of barium intermixed with the said raw rubber. This india-rubber is buoyant in the water by itself without the addition of buoyant means, the specific gravity being about 1.5-2.0, and is also liable to be affected by mineral oil. As far as my knowledge goes, no buoyant and oil-proof india-rubber has hitherto been proposed.

It is desirable to obtain a buoyant and oil-proof india-rubber for use in manufacturing such articles as india-rubber hose for transferring fuel oil on the water, and this invention is proposed for the purpose.

The india-rubber according to this invention consists of raw rubber, factis, sulphur, alkaline soap insoluble in mineral oil and having a comparative low melting temperature and diphenyl-guanidine, intermixed with the said raw rubber, such inorganic solid substances as are used in ordinary india-rubber being not used. The alkaline soap functions to give buoyant and oil-proof character to the india-rubber, melting at a vulcanizing temperature of about 290° Fahr. and spreading about thoroughly and intimately in the tissue of the india-rubber.

My india-rubber composes in about the following proportions—viz, eighty-eight per cent or more of raw rubber, three per cent or less of factis, five per cent or less of sulphur, three per cent or less of alkaline soap such as for example, potassium soap, sodium soap, ammonia soap, and their mixtures, and one per cent or less of diphenyl-guanidine.

In preparing the india-rubber, raw rubber is washed and dried and kneaded for about forty minutes by means of a kneading-roll, after which, the said factis, sulphur, alkaline soap and diphenyl-guanidine being added thereto one after another. The rubber is kneaded again by means of a kneading-roll heated by steam at about twenty pounds pressure. This kneaded material is then molded into any desired shape and subjected to the action of a suitable hot-press and also vulcanized in well-known manner.

Thus prepared india-rubber will float in the water, the specific gravity being about 0.9, and is proof against being affected by mineral oil on account of the existence of the intermixed alkaline soap, and moreover it is less subject to climatic conditions and is more flexible and strong in comparison with the ordinary india-rubber. Oil hose made of the india-rubber composition according to this invention is not only buoyant in the water by itself without any buoys or other flotation devices, but is not liable to be deformed even when piled up on board of a tank-ship, and without the usual spiral spring being applied thereto as in the said ordinary india-rubber hose, and it may consequently be easily handled.

Having now particularly described and ascertained the nature of the said invention, and in what manner the same is to be performed, I declare that what I claim is:

A buoyant and oil-proof india-rubber composition comprising the following ingredients intermixed in approximately the proportions stated, raw-rubber 88%, factis 3%, sulphur 5%, alkaline soap 3% and diphenyl-guanidine 1%.

In testimony whereof I have signed my name to this specification.

EIZO YOSHIOKA.